United States Patent [19]
Morita

[11] Patent Number: 5,527,114
[45] Date of Patent: Jun. 18, 1996

[54] TAPERED ROLLER BEARING WITH ROTATIONAL SPEED DETECTION UNIT

[75] Inventor: Kouichi Morita, Yokohama, Japan

[73] Assignee: NSK Ltd., Tokyo, Japan

[21] Appl. No.: 409,176

[22] Filed: Mar. 23, 1995

[30] Foreign Application Priority Data

Mar. 23, 1994 [JP] Japan ................... 6-051758

[51] Int. Cl.⁶ .................. F16C 32/00; G01P 3/48
[52] U.S. Cl. .................... 384/448; 324/207.25
[58] Field of Search .......... 384/448; 324/207.25; 310/168

[56] References Cited

U.S. PATENT DOCUMENTS

| | | | |
|---|---|---|---|
| 3,716,788 | 2/1973 | Nishida | 324/174 |
| 3,719,841 | 3/1973 | Ritsema | 310/155 |
| 4,161,120 | 7/1979 | Cloarec | 73/494 |
| 4,884,901 | 12/1989 | Harsdorff | 384/448 |
| 5,004,980 | 4/1991 | Ida et al. | 324/166 |
| 5,085,519 | 2/1992 | Dougherty | 384/448 |
| 5,121,998 | 6/1992 | Bhatia | 384/448 |
| 5,125,845 | 6/1992 | Benktander et al. | 384/448 X |
| 5,129,742 | 7/1992 | Tilch et al. | 384/448 |
| 5,308,171 | 5/1994 | Sakamoto | 384/448 |
| 5,372,435 | 12/1994 | Genero et al. | 384/448 |

FOREIGN PATENT DOCUMENTS

| | | |
|---|---|---|
| 0387309 | 11/1990 | European Pat. Off. . |
| 0426298 | 5/1991 | European Pat. Off. . |
| 0484661 | 5/1992 | European Pat. Off. . |
| 1284324 | 9/1972 | United Kingdom . |
| 87/00290 | 1/1987 | WIPO . |

*Primary Examiner*—Thomas R. Hannon
*Attorney, Agent, or Firm*—Helfgott & Karas

[57] ABSTRACT

The tapered roller bearing with rotational speed detection unit has a tone wheel 30 which is externally fixed to an outward-facing cylindrical surface 28 formed on the outer peripheral surface of an inner ring 21 on the front face side, a casing 32 which is internally fixed to an inward-facing cylindrical surface 29 formed on the inner peripheral surface of an outer ring 23 on the back face side, a sensor 33 which is supported inside the casing 32 so as to be faced to the tone wheel 30, whereby there is no interference between the structural components during assembly of the tapered roller bearing, so that the assembly operation can be performed in a similar manner to that for a standard tapered roller bearing not having a rotational speed detection unit, and that miniaturization and lightening of the bearing as well as simplification of the assembly operation are possible.

2 Claims, 6 Drawing Sheets

TAPERED ROLLER BEARING WITH ROTATIONAL SPEED DETECTION UNIT

BACKGROUND OF THE INVENTION

1. Field of the Invention

The present invention is related to a tapered teller bearing fitted with a rotational speed detection unit which is used for example to detect the rotational speed of a vehicle wheel.

2. Description of the Related

In order to control an anti-lock braking system (ABS) used to prevent lookup of a wheel when traveling on a slippery road surface, or to control a traction control system (TCS) used to prevent wheel spin when the accelerator is pressed too hard upon moving off or upon turning on a slippery road surface, it is necessary to detect the rotational speed of the wheel. For this reason there has heretofore been proposed rotational speed detection units with various constructions, and some of these are in fact being used.

FIG. 1 shows, as one example of a conventional well-known rotational speed detection unit, a unit which detects the rotational speed of a drive wheel (in general a rear wheel) for example of a heavy vehicle such as a truck. A housing 1 is supported on a vehicle by means of a suspension unit (not shown in the figure) so as not to rotate when running, while a wheel axle 2 has a tip end portion 2a which is inserted into the housing 1. A wheel (not shown in the figure) is fixedly to an outer peripheral surface of the axle 2 at a portion Inwards from the housing 1 in a widthwise direction of the vehicle.

The term "axially" is hereinafter used to mean an axial direction of the axle (left-right direction in FIG. 1).

A pair of axially separated outer range 3 are fixedly attached to an inner peripheral surface of the housing 1, while a pair of axially separated inner rings 4 are fixedly attached to an outer peripheral surface of the axle 2.

Furthermore, a plurality of tapered rollers 5 are provided between the outer ring raceways 6 on the inner peripheral surfaces of the outer rings 3, and the inner ring raceways 7 on the outer peripheral surfaces of the inner rings 4, respectively so as to be freely rotatable therebetween, thus making up a tapered roller bearing 8.

A disk shaped tone wheel 9 is externally fixed to the tip end portion 2a of the axle 2 at its distal end. The tone wheel 9 is made from a magnetic material such as steel, and is formed on its outer side face (right side face in FIG. 1) with alternate ridges and recess around a peripheral direction thereof.

Moreover, a sensor 11 is retained in a holder 19 which is fixedly engaged in an opening portion in an axially outer end of the housing 1. The sensor 11 comprises a permanent magnet 34 magnetized along an axial direction thereof, a pole piece 12 made from a magnetic material, and a coil 13 wound around the pole piece 12. An axially inner end face (left end face in FIG. 1) of the pole piece 12 is faced to the axially outer side face of the tone wheel 9 with a small gap therebetween. The tone wheel 9 and the sensor 11 make up a rotational speed detection unit, which functions in the following manner to detect the rotational speed of the axle 2.

Specifically when the tone wheel 9 rotates together with the axle 2, the gap between the axially outer side face of the tone wheel 9 and the axially inner end face of the pole piece 12 changes, so that the density of the magnetic flux passing through the pole piece 12 changes. As a result, the electromotive force induced in the coil 13 wound around the tone wheel 9 changes sinusoidally. Since the frequency of change of the electromotive force in the coil 13 is proportional to the rotational speed of the axle 2, then if the electromotive force is input as an output signal from the sensor 11, to a control unit for an ABS or TCS, then the ABS or TCS can be controlled.

With the conventional arrangement constructed and used as described above, since the rotational speed detection unit is provided independently as a separate unit from the tapered roller bearing 8, then the number of operations or steps involved in assembling the rotating support portions of the rotational speed detection unit is considerable, and the assembly operation complicated so that not only is cost increased but also miniaturization of the rotating support portions becomes difficult.

Moreover, in order to accurately detect the rotational speed, the dimensions of the small gap between the sensor 11 and the tone wheel 9 must be accurately controlled to meet the design value. However, with the construction wherein the rotational speed detection unit and the tapered roller bearing 8 are provided independently as separate units, the adjustment operation of the small gap is difficult.

To simplify the assembly of the rotating support portions with the rotational speed detection unit installed in it, a construction as shown in FIG. 2, has been disclosed in Japanese Utility Model First Publication KOKAI NO. 2-101274, which eliminates the need for adjustment of the small gap. With this construction, an outer ring raceway 15 is formed on one axial side (left side in FIG. 2) of an inner peripheral surface of an outer ring 14, while an inner ring raceway 17 is formed on the one axial side (left side in FIG. 2) of an outer peripheral surface of an inner ring 16. A plurality of balls 18 ere provided between the outer ring raceway ring 15 and the inner ring raceway ring 17 so as to be freely rotatable therebetween, thus making up a ball bearing.

With regards to the ball bearing constructed in this manner, the other axial side of the outer peripheral surface (right side in FIG. 2) of the inner ring 16 is formed with a pulse generating device 19 which is operated as a tone wheel or pulse ring, while a sensor 20 is mounted on the other axial side of the inner peripheral surface of the outer ring 14 so as to be faced to the pulse generating device 19. This ball bearing with the pulse generating device 19 and the censor 20 assembled in this manner is used with the outer ring 14 fixed end the inner ring 16 rotating. When the inner ring 16 rotates, an output signal from the sensor 20 changes with a frequency proportional to the rotational speed of the inner ring 16.

With the construction disclosed in this publication consideration has been centered on the assembly of a rotational speed detection unit into a ball bearing. However, when applied in this form to tapered roller bearings, which is the subject of the present invention, problems arise in the assembly operation. More specifically, with tapered roller bearings, since there is assembly directionality at the time of assembling the outer ring, inner ring, and tapered roller bearings, then if the tone wheel and the sensor are simply mounted on the inner ring and the outer ring as in FIG. 2, assembly becomes impossible,

SUMMARY OF THE INVENTION

The tapered roller bearing with the rotational speed defection unit according to the present invention comprises an inner ring having an inner ring raceway on an outer peripheral Surface thereof, an outer ring having an outer ring raceway on an inner peripheral surface thereof, a plurality of tapered rollers provided between the inner ring raceway and the outer ring raceway so as to be freely rotatable therebetween, the inner ring having an outward-facing cylindrical surface formed on an outer peripheral surface of the inner ring on the front face side and faced radially outwards, the outer ring having an inward-facing cylindrical surface formed on an inner peripheral surface of the outer ring on the back face side and faced radially inwards, a tone wheel fixed to one of the cylindrical surfaces which rotates during use, a easing fixed to the other of the cylindrical surfaces which does not rotate during use, and a sensor supported in the easing so that a detection portion thereof is faced to the tone wheel.

The term "front face side" means the side of the bearing ring where no axial load is supported while the term "back face side" means the side of the bearing ring where the axial load is supported.

Other objects and aspects of the present invention, will become apparent from the following description of embodiments given in conjunction with the appended drawings.

DESCRIPTION OF THE PREFERRED EMBODIMENTS

Figure 1:
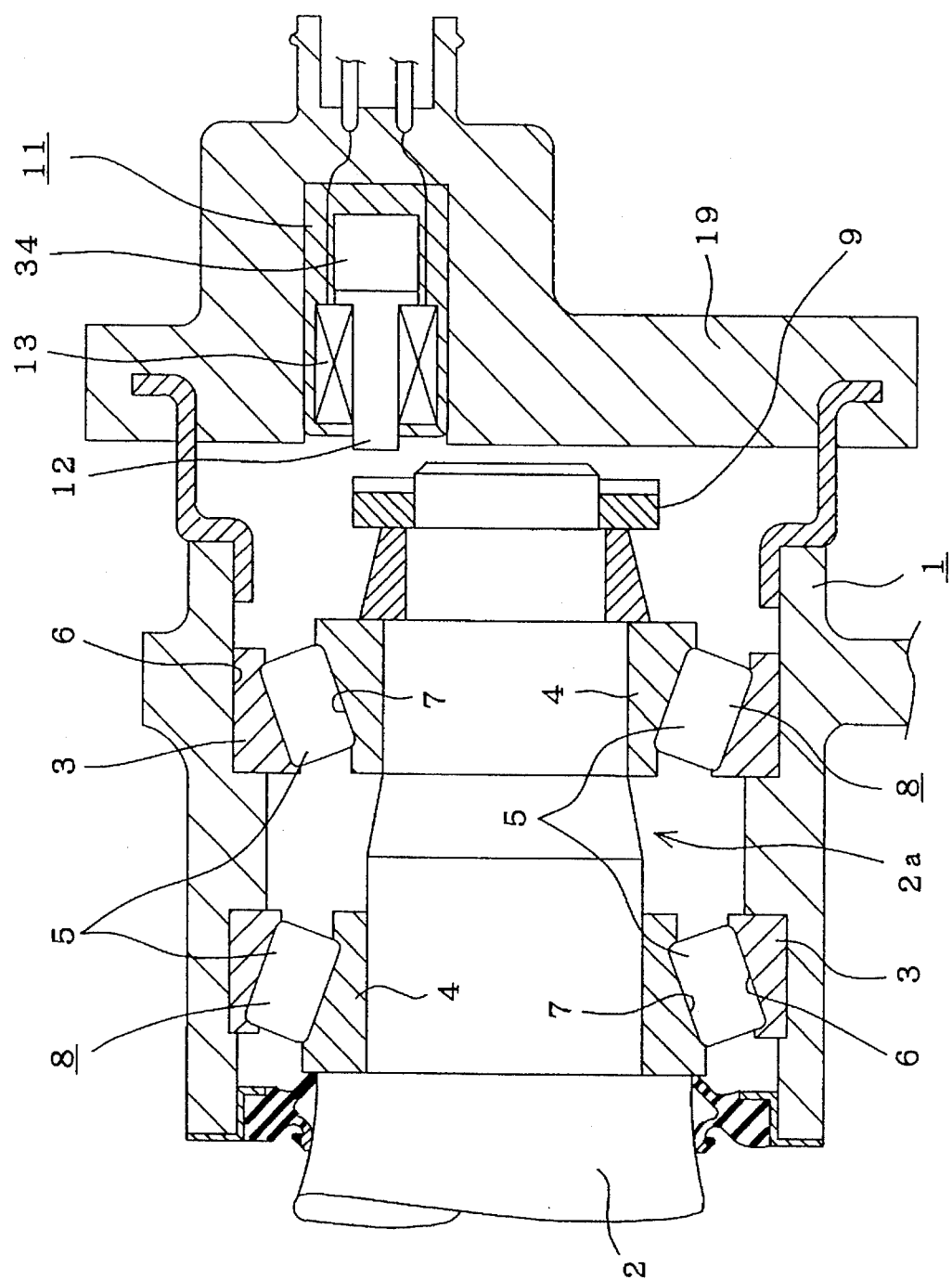
FIG. 1 is a cross sectional view showing a first example of a conventional construction.
Figure 2:
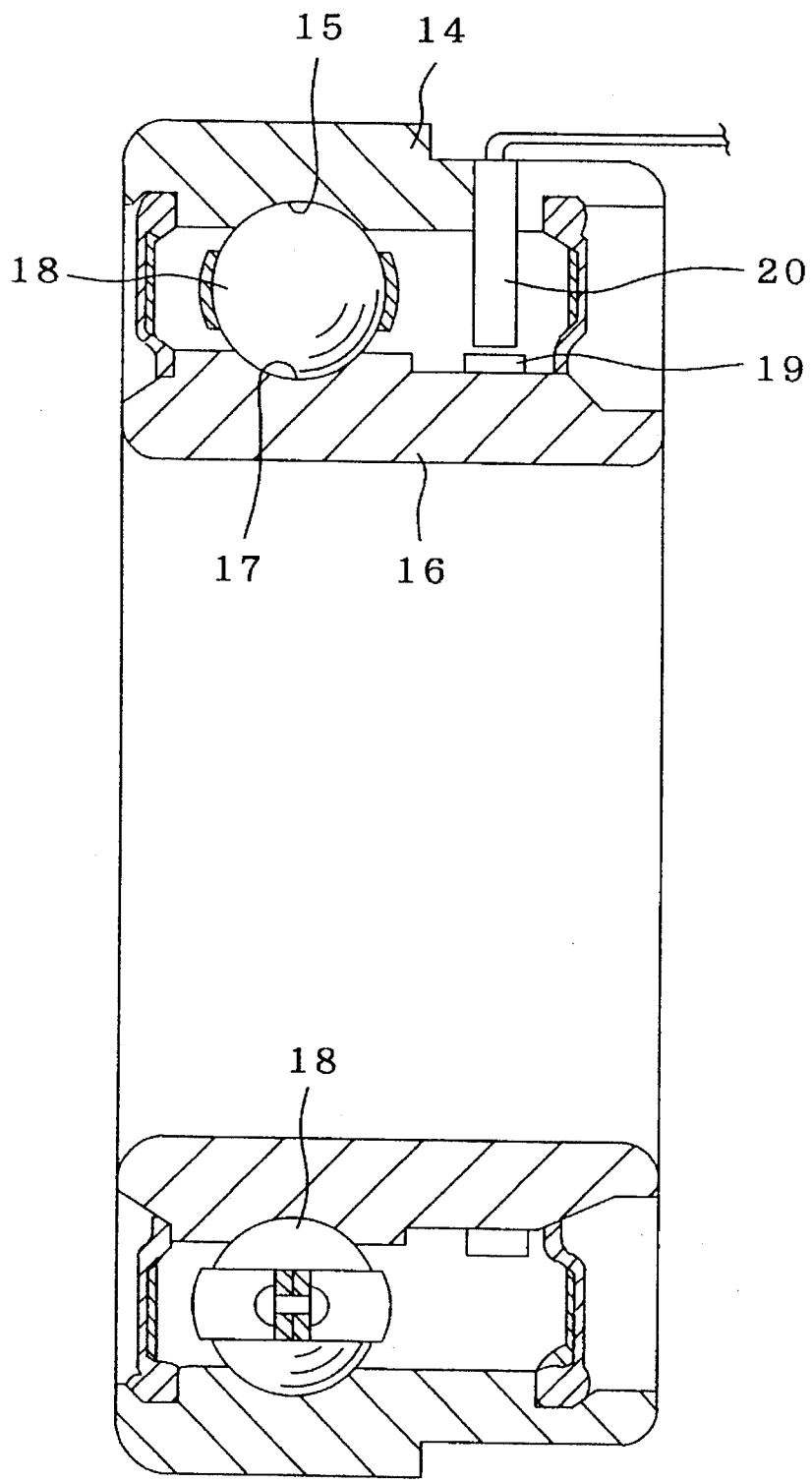
FIG. 2 is a cross sectional view showing a second example of a conventional construction.
Figure 3:
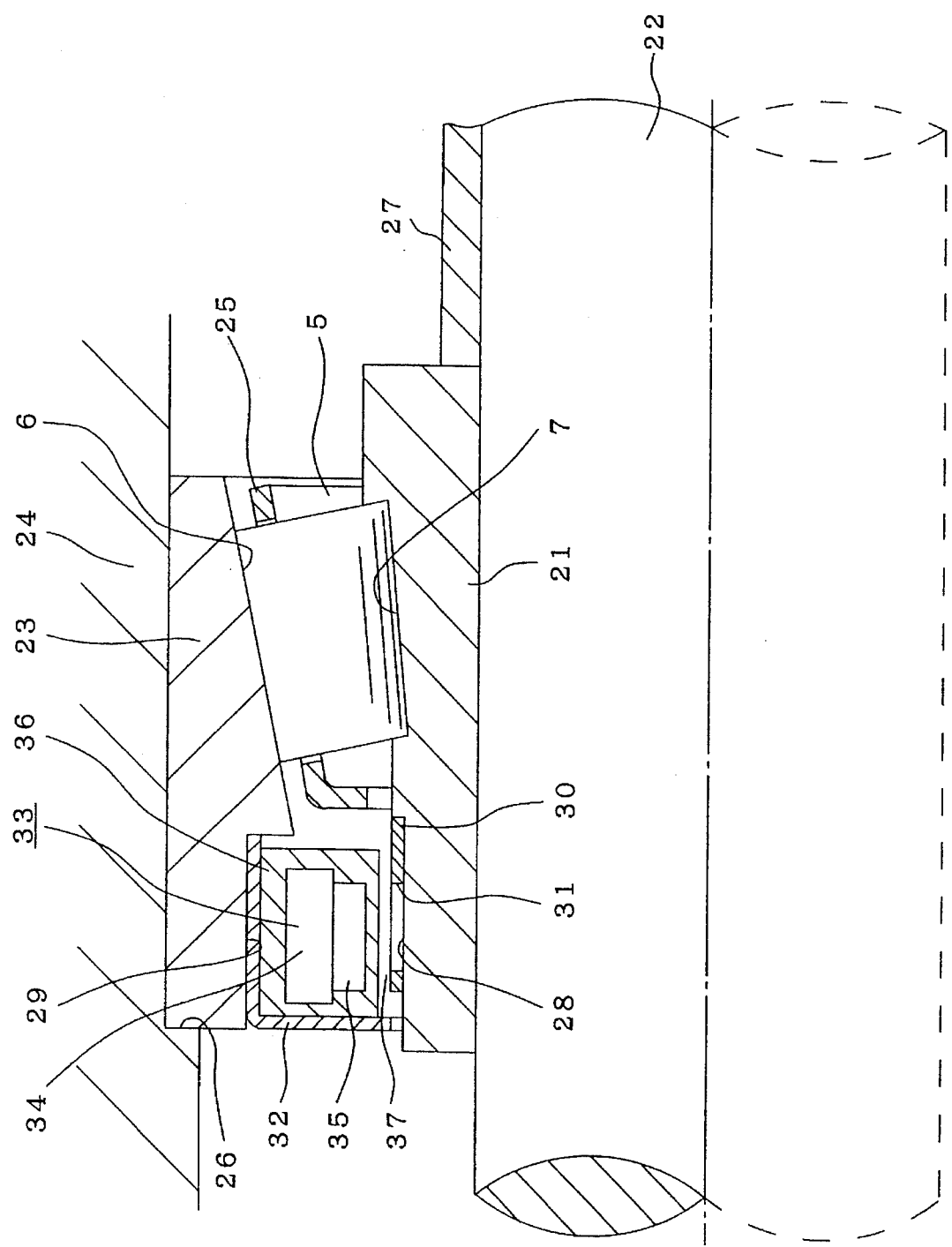
FIG. 3 is a half cross sectional view showing a first embodiment of the present invention.

A first embodiment of the present invention is shown in FIG. 3. An inner ring 21 is externally fitted to a rotating shaft 22 so as to rotate together therewith, while an outer ring 23 is internally fitted to a housing 24 and does not rotate. An inner ring raceway 7 having a tapered external or convex surface is formed on an outer peripheral surface of the inner ring 21, while an outer ring raceway 6 having a tapered internal or concave surface is formed on an inner peripheral surface of the outer ring 23. A plurality of tapered rollers 5 are provided between the inner ring raceway 7 and the outer ring raceway 6 so as to be freely rotatable therebetween. There is a retainer 25 for retaining the plurality of tapered rollers 5, while allowing free rotation thereof.

The housing 24 has a step portion 26 which is formed on an inner peripheral surface of the housing 24, and is abutted against an end face on the back face side of the outer rang 23 or specifically on the side where the inner diameter of the outer ring raceway 6 is smaller. Moreover, a stop ring 27 is externally fitted to an outer peripheral surface of the rotating shaft 22, and has an axial end face thereof abutted against the axial end face of the inner ring 21 on the back face side or specifically on the side where the outer diameter of the inner ring raceway 7 is larger.

The term "front face side" means the side of the bearing ring where no axial load is supported while the term "back face side" means the side of the bearing ring where the axial load is supported.

With this arrangement, the plurality of tapered rollers 5 are subjected to a required preload by pressing the outer ring 23, the inner ring 21, and the plurality of tapered rollers 5 in an axial direction between the step 26 and the stop ring 27.

In the tapered roller bearing constructed as described above, an outward-facing cylindrical surface 28 is formed on an outer peripheral surface of the inner rang 21 on the front face side or specifically on the side where the outer diameter of the inner ring raceway 7 is smaller, while an inward-facing cylindrical surface 29 is formed on an inner peripheral surface of the outer ring 23 on the back face side.

An annular shaped tone wheel 30 is externally fixed to the outward-facing cylindrical surface 28 which rotates during use. The tone wheel 30 is formed in a cylindrical shape from a magnetic material such as steel, with a plurality of through holes 31 arranged at even spacing around a peripheral direction thereof. Consequently, the magnetic characteristics of the tone wheel 30 change alternately around the peripheral direction.

More specifically, the through-holes 31 constitute high resistance portions having e high resistance to the passage of a magnetic flux, while intermediate portions between the adjacent through-holes 31 constitute low resistance portions having only a very low resistance to the passage of the magnetic flux.

A casing 32 is internally fixed to the inward-facing cylindrical surface 29 which does not rotate during use. The casing 32 is made from a magnetic metal plate such as a steel plate and formed into a overall annular shape of "L" shape in cross section. A Censor 33 is supported at a location inside the casing 32.

With the embodiments shown in the figures, the sensor 33 comprises a permanent magnet 34 and a Hole IC 35 arranged in series along the direction of the magnetic flux flow, or specifically the vertical direction in FIG. 3, for the portion passing through the sensor 33, with the permanent magnet 34 magnetized in the direction of the magnetic flux flow. The sensor 33 is supported inside the casing 32 by molding in a synthetic resin 36, so that the Hole IC 35 which constitutes the detection portion of the sensor 33 has an end face which is faced to the tone wheel 30 with a predetermined gap 37 therebetween.

With the tapered roller bearing fitted with a rotational speed detection unit, according to the present invention constructed as described above, when the rotating Shaft 22 rotates, the respective through-holes 31 and intermediate portions between the adjacent through-holes 31 formed in the tone wheel 30, alternately pass in the vicinity of the Hole IC 35 of the sensor 33. At the instant when the intermediate portions pass in the vicinity of the Hole IC 35, the density of the magnetic flux passing through the Hole IC 85 increases, while at the instant when the through-holes 31 pass in the vicinity of the Hole IC 33, the density of the magnetic flux passing through the Hole IC 35 reduces. The output signal of the sensor 33 thus changes in accordance with this change in magnetic flux density through the Hole IC 35, and if this output signal is then input to a control unit, an ABS or TCS can be controlled.

In particular, with the tapered roller bearing fitted with a rotational speed detection unit, according to the present invention, the rotational speed detection unit comprising the tone wheel 30 and the sensor 33 is assembled integrally with the tapered roller bearing. Therefore the number of operations or steps involved in assembling the rotating support portions having the rotational speed detection unit is reduced, and the assembly operation simplified, so that cost can be reduced, and the rotating support portions can become compact.

More specifically, since the mounting location of the tone wheel 30 and the sensor 33 is designed into the bearing, the bearing can be assembled with the tone wheel 30 and sensor 33 respectively mounted on the inner ring 21 and the outer ring Therefore, the assembly operation for the tapered roller bearing fitted with a rotational speed detection unit can be performed in a similar manner to that for a standard tapered roller bearing not having a rotational speed detection unit.

The assembly operation of the bearing is as follows. Initially the outer ring 23 to which the casing 32 and sensor 33 have been fixed beforehand, is internally fitted into the housing 24. Then the plurality of tapered rollers 5 retained by the retainer 25 are inserted inside the outer ring 23. After this, the inner ring 21 with the tone wheel 30 pre-attached, is inserted inside the tapered rollers 5. It is also possible to externally fix the inner ring 21 and stop ring 27 to the rotating shaft 22 beforehand, and insert the inner ring 21 and rotating shaft 22 together inside the tapered rollers 5. In either case, the assembly operation for the tapered roller bearing fitted with a rotational speed detection unit is performed in a similar manner to that for a standard tapered roller bearing not having rotational speed detection unit.

with the tapered roller bearing fitted with a rotational speed detection unit, according to the present invention constructed as described above, the rotational speed detection unit and the tapered roller bearing are integrally assembled as a single unit. Therefore the number of operations involved assembling the rotating support portions having the rotational speed detection unit in it is reduced, and the assembly operation simplified, so that cost can be reduced, and the rotating support portions can become compact. More specifically, since the mounting location of the tone wheel and the sensor is designed into the bearing, the bearing can be assembled in the condition that the tone wheel and sensor are respectively mounted on the inner ring and the outer ring or on the outer ring and the inner ring. Therefore, the assembly operation for the tapered roller bearing fitted with a rotational speed detection unit can be performed in a similar manner to that for a standard tapered roller bearing, that is, for the one not having rotational speed detection unit.

Figure 4:
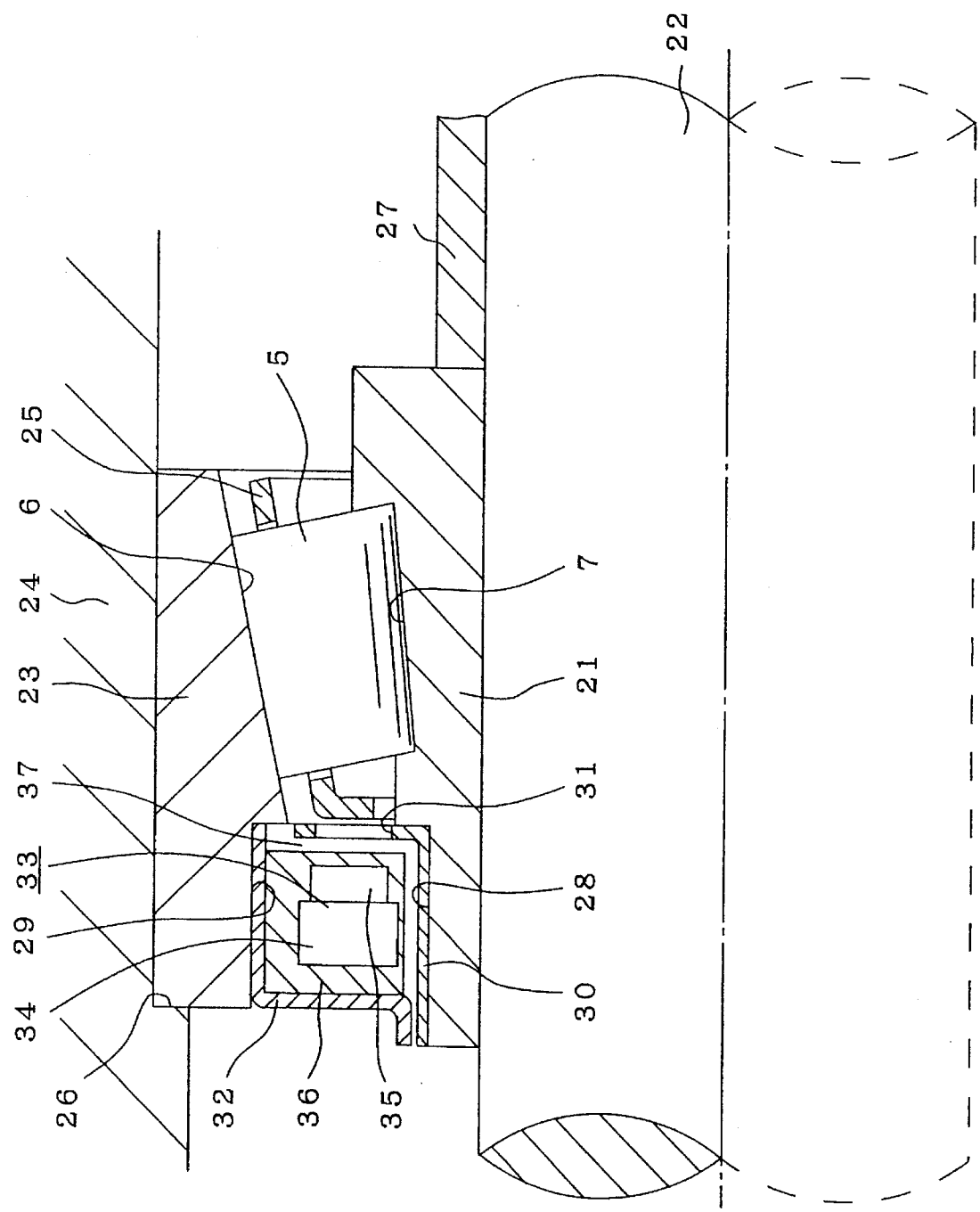
FIG. 4 is a half cross sectional view showing a second embodiment of the present invention.

FIG. 4 shows a second embodiment of the present invention. With this embodiment, instead of the tone wheel 30 and the Hole IC 35 of the sensor 33 faced to each other in the radial direction in the first embodiment, the tone wheel 30 and the Hole IC 35 are faced to each other in the thrust direction. Consequently, the tone wheel 30 used in this embodiment, is formed from a magnetic metal plate in an overall annular shape of "L" shape in cross section, with a plurality of through-holes 31 formed in the outwardly flanged portion thereof which protrudes from an outer permanent surface of an inner ring 21. A permanent magnet 34 and a Hole IC 35 making up the sensor 33 are aligned along an axial direction of a rotating shaft 22 (left-right direction in FIG. 4). Other details of the construction and operation are the same as for the first embodiment, and hence similar portions are indicated by the same symbols and repeated description omitted.

Figure 5:
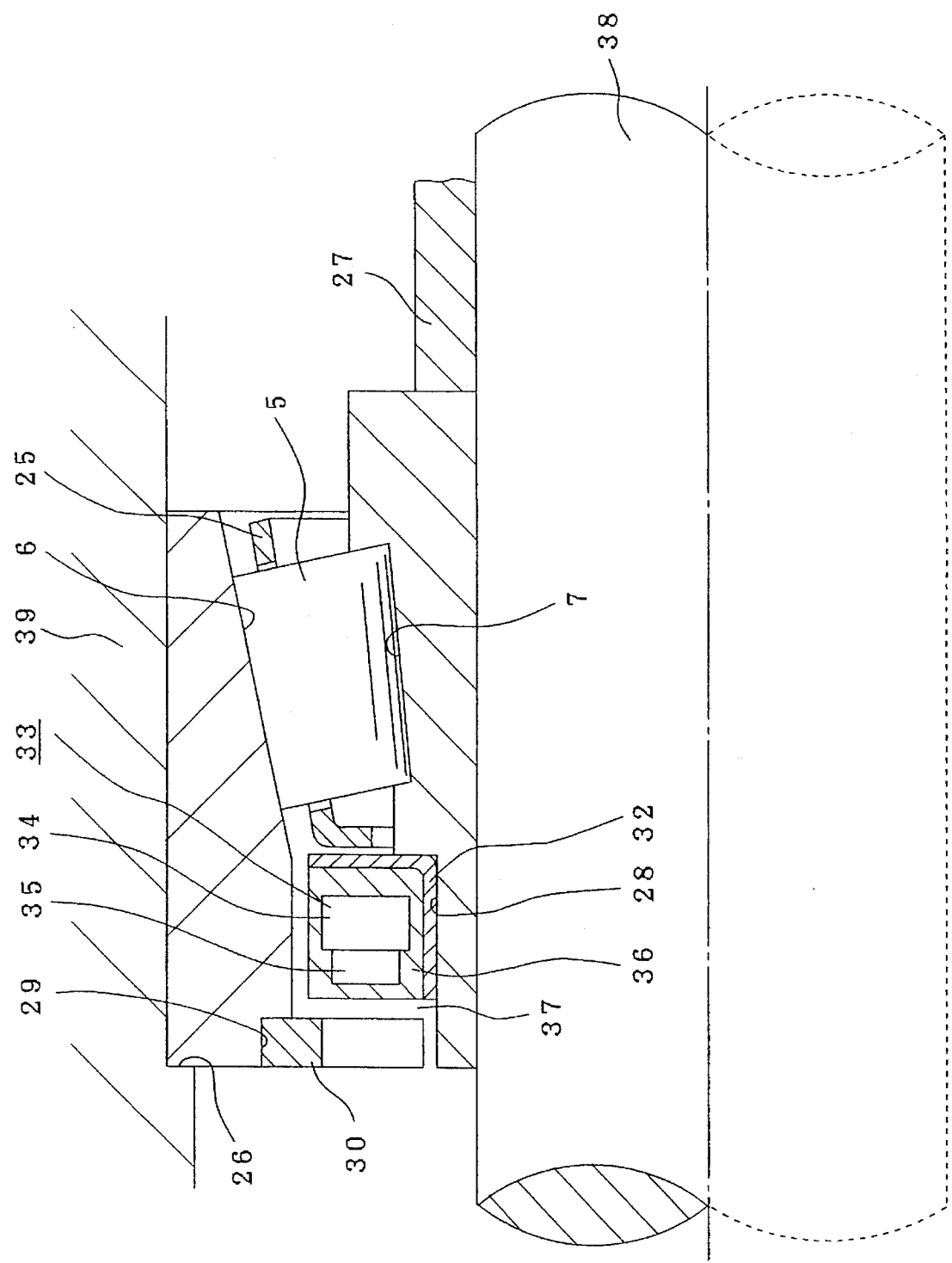
FIG. 5 is a half cross sectional view showing a third embodiment of the present invention.

FIG. 5 shows a third embodiment of the present invention contrast to the first and second embodiments wherein the present invention is applied to the construction with the rotating shaft 22 supported inside of the fixed housing 24, with the third embodiment, the present invention is applied to the construction wherein a rotating member such as a hub 39 is supported around a non-rotating or stationary shaft 38. Therefore with the third embodiment, a casing 32 with a sensor 33 supported therein, is externally fixed to an outward-facing cylindrical surface 28 which does not rotate. Moreover, a tone wheel 30 is internally fitted to an inward-facing cylindrical surface 29 which rotates. The tone wheel 30 As formed in a disk shape from a magnetic material, with comb like or gear like irregularities formed on an inner peripheral rim thereof.

With the third embodiment, since the output signal from the sensor 33 changes with rotation of the hub 39, then if this output signal is input to a control unit, the rotational speed of the hub 39 can be known. Other details of the construction and operation are the same as for the first and second embodiments, and hence similar portions are indicated by the same symbols and repeated description omitted.

Figure 6:
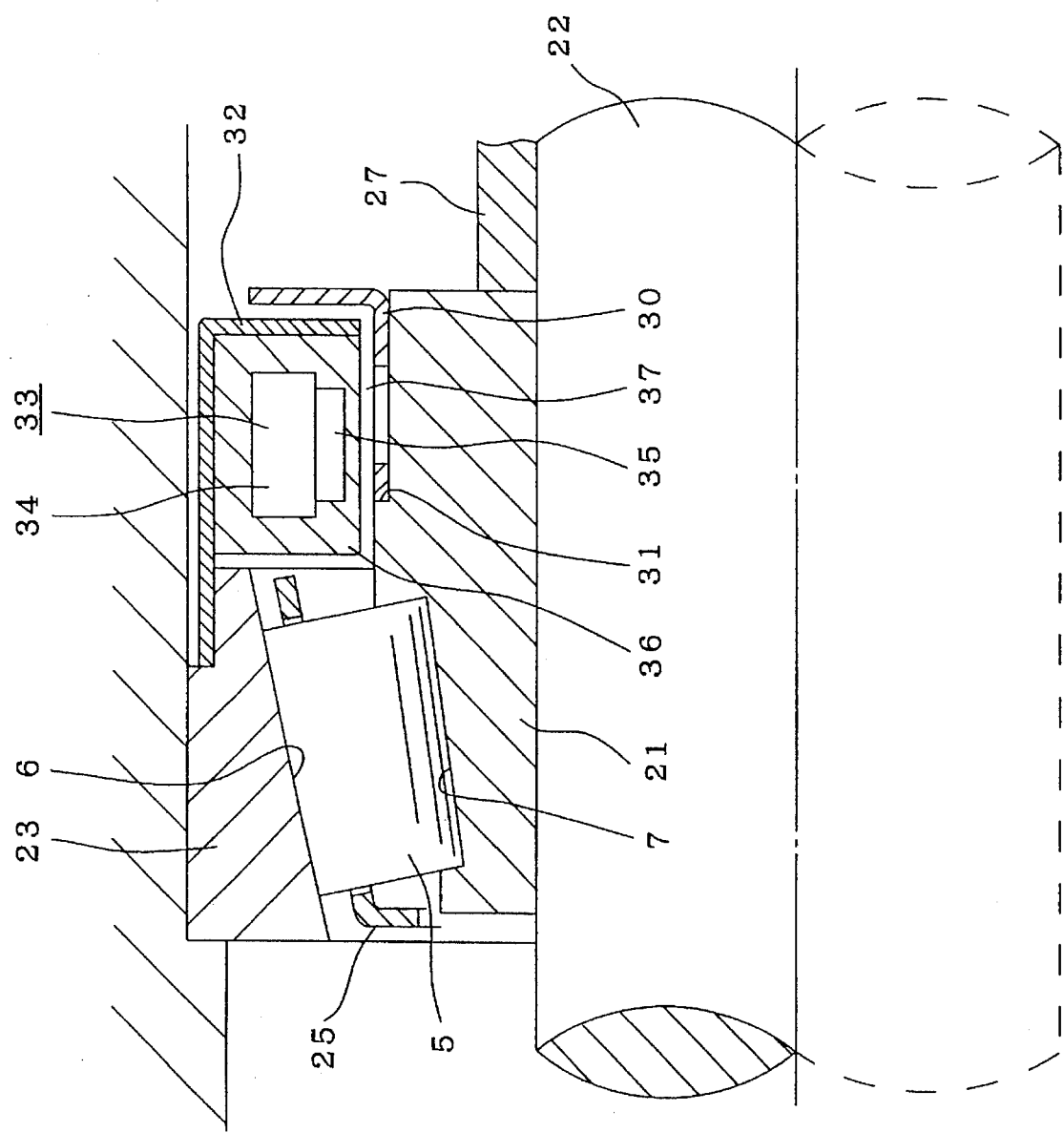
FIG. 6 is a half cross sectional view showing a construction which is outside of the technical scope of the present invention.

FIG. 6 shows a construction outside of the scope of the present invention for comparison, where the mounting locations of the constituent parts are opposite to those for the present invention. Specifically the sensor 33 is mounted to the outer ring 23 on the front face side, whale the tone wheel 30 is mounted to the inner ring 21 on the back face side. In this construction, it is difficult to assemble the tapered rollers 5 with the sensor 33 fixed to the outer ring 23. If the inner diameter of the casing 32 and of the sensor 33 is made larger than the diameter of the circumscribing circle of the plurality of tapered rollers 5, then the tapered rollers 5 can be assembled with the sensor 33 fixed to the outer ring 23 even with the various components fixed in the locations as shown in With this arrangement, however, the cross sectional area of the portion wherein the sensor can be fitted will be extremely narrow, so that in reality the arrangement will be difficult to realize. Accordingly, the construction as shown in FIG. 6 is outside of the technical scope of the present invention Since the tapered roller bearing fitted with a rotational speed detection unit, according to the present invention is constructed and operated as described above, then the following effects 1 to 3 can be obtained.
1. The rotational speed detection unit and the tapered roller bearing can be made as a single unit, thus enabling miniaturization and lightening of the rotating support portions in the rotational speed detection unit, and simplification of the assembly operation.
2. The need for adjustment of the gap between the sensor and tone wheel is eliminated, thus simplifying the assembly adjustment of the rotating support portions.
3. The assembly operation for the tapered roller bearing fitted with the rotational speed detection unit can be performed in a similar manner to that for a standard tapered roller bearing not having a rotational speed detection unit, while maintaining sensor assembly space enough.

What is claimed is:

1. A tapered roller bearing with a rotational speed detection unit to be set in a housing with a cylindrical hole, comprising an inner ring with front and back side faces having an outer peripheral surface on which an inner ring raceway is formed, an outer ring with front and back side faces having an inner peripheral surface on which an outer ring raceway is formed and an outer peripheral surface which is securely fitted to the cylindrical hole of the housing, a plurality of tapered rollers provided between the inner ring raceway and the outer ring raceway so as to be freely rotatable therebetween, the inner ring having an outward-facing cylindrical surface formed on an outer peripheral surface of the inner ring on the front side, the outer ring having an inward facing cylindrical surface formed on an inner peripheral surface of the outer ring on the back face side, a tone wheel fixed to one of the cylindrical surfaces which rotates during use, a casing fixed to the other of the cylindrical surfaces which does not rotate during use, and a sensor supported in the casing and having a detection portion thereof faced to the tone wheel.

2. A tapered roller bearing with a rotational speed detection unit to be set in a housing with a cylindrical hole, comprising an inner ring having an outer peripheral surface on which an inner ring raceway is formed, an outer ring having an inner peripheral surface on which an outer ring raceway is formed and an outer peripheral surface which is securely fitted to the cylindrical hole of the housing, a plurality of tapered rollers with larger diameter end and smaller diameter end provided between the inner ring raceway and the outer ring raceway so as to be freely rotatable therebetween, the inner ring having an outward-facing cylindrical surface formed on an outer peripheral surface of the inner ring, the outer ring having an inward-facing cylindrical surface formed on an inner peripheral surface of the outer ring, a tone wheel adjacent to the smaller diameter end of the tapered rollers and provided fixed to one of the cylindrical surfaces which rotates during use, a casing provided adjacent to the smaller diameter end of the tapered rollers and fixed to the other of the cylindrical surfaces which does not rotate during use, and a sensor supported in the casing and having a detection portion thereof faced to the tone wheel.

* * * * *